(12) United States Patent
Liu et al.

(10) Patent No.: US 12,468,364 B2
(45) Date of Patent: Nov. 11, 2025

(54) CONTROL CHIP AND CONTROL METHOD THEREOF

(71) Applicant: Nuvoton Technology Corporation, Hsinchu Science Park (TW)

(72) Inventors: Jen-Chih Liu, Kaohsiung (TW); Chieh-Sheng Tu, Hsinchu Science Park (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 31 days.

(21) Appl. No.: 18/401,465

(22) Filed: Dec. 30, 2023

(65) Prior Publication Data

US 2024/0419231 A1 Dec. 19, 2024

(30) Foreign Application Priority Data

Jun. 13, 2023 (TW) ................................ 112121920

(51) Int. Cl.
*G06F 1/26* (2006.01)
*G06F 1/3234* (2019.01)
(Continued)

(52) U.S. Cl.
CPC ............ *G06F 1/266* (2013.01); *G06F 1/3253* (2013.01); *G06F 13/385* (2013.01); *G06F 13/4068* (2013.01)

(58) Field of Classification Search
CPC .... G06F 1/266; G06F 1/26; G06F 2213/0042; H02J 7/00034; H02J 7/007
See application file for complete search history.

(56) References Cited

U.S. PATENT DOCUMENTS

| 2021/0075324 A1 | 3/2021 | Zeng et al. | |
| 2023/0083174 A1* | 3/2023 | Koja | G06F 13/4282 710/106 |
| 2023/0379614 A1* | 11/2023 | Li | H02J 7/00034 |

FOREIGN PATENT DOCUMENTS

| CN | 104618122 A | 5/2015 | |
| EP | 3477810 A1 * | 5/2019 | H02J 7/00036 |

(Continued)

OTHER PUBLICATIONS

Office Action (with Search Report) issued in corresponding TW application No. 112121920 dated May 13, 2024 (10 pages).

*Primary Examiner* — Ryan Johnson
(74) *Attorney, Agent, or Firm* — MUNCY, GEISSLER, OLDS & LOWE, P.C.

(57) ABSTRACT

A control chip providing power to a sink device and including a connection port, an encoder, a decoder, and a control circuit is provided. The connection port provides an output voltage and an inquiry signal to the sink device, and receives an acknowledgement signal provided by the sink device. The encoder generates the inquiry signal. The decoder decodes the acknowledgement signal to generate a decoded result. In a compensation mode, the control circuit obtains an actual voltage received by the sink device according to the decoded result and adjusts the output voltage according to the actual voltage received by the sink device. In a setting mode, the control circuit obtains a protect-point voltage of the sink device according to the decoded result and adjusts the output voltage according to the protect-point voltage of the sink device to prevent the output voltage from being higher than the protect-point voltage.

16 Claims, 5 Drawing Sheets

(51) Int. Cl.
*G06F 13/38* (2006.01)
*G06F 13/40* (2006.01)

(56) References Cited

FOREIGN PATENT DOCUMENTS

| | | | |
|---|---|---|---|
| TW | 201709079 A | * | 3/2017 |
| TW | 202125246 A | | 7/2021 |

* cited by examiner

CONTROL CHIP AND CONTROL METHOD THEREOF

CROSS REFERENCE TO RELATED APPLICATIONS

This Application claims priority of Taiwan Patent Application No. 112121920, filed on Jun. 13, 2023, the entirety of which is incorporated by reference herein.

BACKGROUND OF THE INVENTION

Field of the Invention

The present invention relates to a control chip, and, in particular, to a control chip that provides an appropriate output voltage to an external chip according to the voltage upper limit of the external chip.

Description of the Related Art

Generally, a power supply chip provides output voltage to an external chip according to a request from the external chip. However, sometimes the external chip outputs an abnormal request, requesting that the power supply chip provide an excessive output voltage, for example. If the power supply chip follows this abnormal request, the external chip may become damaged by the excessive output voltage. In addition, when the power supply chip provides power to an external chip via a connection line, the actual voltage received by the external chip is lower than the voltage provided by the power supply chip. This is because the actual voltage received by the external chip is affected by the line resistance of the connection line.

BRIEF SUMMARY OF THE INVENTION

In accordance with an embodiment of the disclosure, a control chip provides power to a sink device. The control chip comprises a connection port, an encoder, a decoder, and a control circuit. The connection port comprises a power pin and a communication pin. The power pin is configured to provide an output voltage to the sink device. The communication pin is coupled to the sink device, provides an inquiry signal to the sink device according to a communication protocol, and receives an acknowledgement signal provided by the sink device. The encoder encodes inquiry information to generate the inquiry signal. The decoder decodes the acknowledgement signal to generate a first decoded result. The control circuit provides the inquiry information and operates in a compensation mode or a setting mode. In the compensation mode, the control circuit obtains an actual voltage received by the sink device according to the first decoded result and adjusts the output voltage according to the actual voltage received by the sink device. In the setting mode, the control circuit obtains a protect-point voltage of the sink device according to the first decoded result and adjusts the output voltage according to the protect-point voltage of the sink device to prevent the output voltage from being higher than the protect-point voltage.

In accordance with another embodiment of the disclosure, a control chip comprises a connection port, an encoder, a control circuit, and a decoder. The connection port comprises a power pin and a communication pin. The power pin is configured to receive an output voltage provided by a power source. The communication pin is coupled to the power source, receives an inquiry signal from the power source, and outputs an acknowledgement signal. The encoder encodes the inquiry signal to generate an encoded result. The control circuit performs a detection operation or a notification operation according to the encoded result. In response to the control circuit performing the detection operation, the control circuit detects the output voltage to generate a detection result. In response to the control circuit performing the notification operation, the control circuit provides a protect-point voltage. The decoder decodes the detection result or the protect-point voltage to generate the acknowledgement signal.

An exemplary embodiment of a control method for a control chip is described in the following paragraph. An output voltage is provided to a sink device. An inquiry signal is sent to the sink device. An acknowledgement signal provided by the sink device is received. A compensation operation or a setting operation is performed according to the acknowledgement signal. The compensation operation is performed to adjust the output voltage so that the output voltage received by the sink device is equal to an initial value. The setting operation is performed to prevent the output voltage from being higher than a protect-point voltage.

Control methods may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes a control chip for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
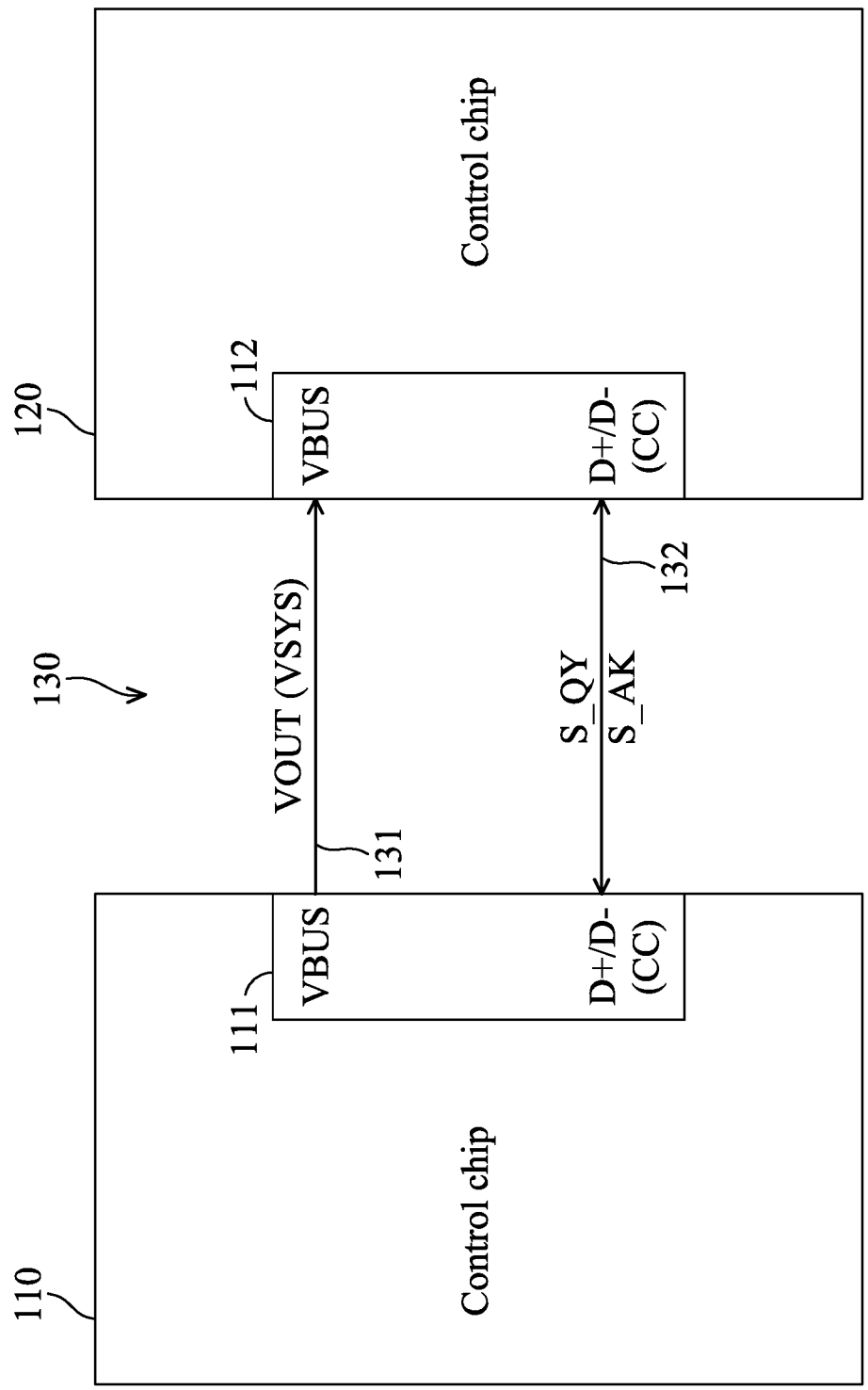
FIG. 1 is a schematic diagram of an exemplary embodiment of an operation system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operation system according to various aspects of the present disclosure. The operation system 100 comprises control chips 110 and 120. In this embodiment, the control chip 110 is provided as a power source which provides an output voltage VOUT. The control chip 120 receives the output voltage VOUT and uses the output voltage VOUT as a system voltage VSYS. In this case, the control chip 120 serves as a sink device.

The control chip 110 comprises a transmission interface 111. The transmission interface 111 is configured to transmit the output voltage VOUT to the control chip 120. The control chip 120 comprises a transmission interface 112. The transmission interface 112 is configured to receive the output voltage VOUT. The types of transmission interfaces 111 and 112 are not limited in the present disclosure. Any transmission interface can serve as the transmission interface 111 or 112, as long as the transmission interface is capable of transmitting power. In one embodiment, each of the transmission interfaces 111 and 112 is an universal serial bus (USB) connection port. In this case, the power pin VBUS of the transmission interface 111 transmits the output voltage VOUT, and the power pin VBUS of the transmission interface 112 receives the output voltage VOUT.

In other embodiments, each of the transmission interfaces 111 and 112 further comprises pins D+ and D−, which are referred to as communication pins. The control chip 110 communicates with the control chip 120 via the pins D+ and D− of the transmission interface 111. For example, the control chip 110 may send an inquiry signal S_QY to the control chip 120 and receive an acknowledgement signal S_AK generated by the control chip 120 via the pins D+ and D−. In this case, the control chip 120 receives the inquiry signal S_QY from the control chip 110 via the pins D+ and D− of the transmission interface 112. The control chip 120 performs a corresponding operation according to the inquiry signal S_QY to generate a performed result and generates the acknowledgement signal S_AK according to the performed result. The control chip 120 outputs the acknowledgement signal S_AK to the control chip 110 via the pins D+ and D−.

In another embodiment, the control chip 120 may sends an inquiry signal S_QY to the control chip 110 via the pins D+ and D− and receives an acknowledgement signal S_AK generated by the control chip 110 via the pins D+ and D−. In this case, the control chip 110 receives the inquiry signal S_QY from the control chip 120 via the pins D+ and D− of the transmission interface 111. The control chip 110 performs a corresponding operation according to the inquiry signal S_QY to generate a performed result and generates the acknowledgement signal S_AK according to the performed result. The control chip 110 outputs the acknowledgement signal S_AK to the control chip 120 via the pins D+ and D−. In other embodiments, the control chip 120 controls the control chip 110 via the pins D+ and D− of the transmission interface 112 to adjust the output voltage VOUT. In this case, the control chip 110 according the request of the control chip 120 to adjust the output voltage VOUT.

In other embodiments, the control chip 110 communicates with the control chip 120 via the configuration channel pin CC of the transmission interface 111. In this case, the control chip 110 may utilize the pin CC (or referred to as a communication pin) of the transmission interface 111 to send an inquiry signal S_QY to the control chip 120 and receive an acknowledgement signal S_AK from the control chip 120. In another embodiment, the control chip 120 uses the pin CC of the transmission interface 112 to sends an inquiry signal S_QY to the control chip 110 and receive an acknowledgement signal S_AK from the control chip 110.

In some embodiments, the operation system 100 further comprises a connection line 130. The type of the connection line 130 is not limited in the present disclosure. In one embodiment, the connection line 130 is a USB connection line. The connection line 130 is coupled between the control chips 110 and 120 and has a power path 131. In this case, the power path 131 is coupled between the power pins VBUS of the transmission interfaces 111 and 112 to transmit the output voltage VOUT.

In other embodiments, the connection line 130 further comprises a communication path 132. The communication path 132 is used to transmit the inquiry signal S_QY and the acknowledgement signal S_AK. The communication path 132 may comprise a first sub-path and a second sub-path. The first sub-path is coupled between the pin D+ of the transmission interface 111 and the pin D+ of the transmission interface 112. The second sub-path is coupled between the pin D1 of the transmission interface 111 and the pin D− of the transmission interface 112. In another embodiment, the communication path 132 is coupled between the pin CC of the transmission interface 111 and the pin CC of the transmission interface 112.

The source providing the inquiry signal S_QY and the source providing the acknowledgement signal S_AK are not limited in the present disclosure. In one embodiment, when the control chip 110 sends an inquiry signal S_QY, the control chip 120 generates an acknowledgement signal S_AK according to the inquiry signal S_QY and provides the acknowledgement signal S_AK to the control chip 110. In another embodiment, when the control chip 120 sends an inquiry signal S_QY, the control chip 110 generates an acknowledgement signal S_AK according to the inquiry signal S_QY and provides the acknowledgement signal S_AK to the control chip 120.

The control chip 120 uses the output voltage VOUT as its system voltage VSYS and operates according to the system voltage VSYS. To brevity, the output voltage VOUT represents the voltage provided by the control chip 110, and the system voltage VSYS represents the voltage received by the control chip 120. When the connection line 130 transmits the output voltage VOUT generated by the control chip 110 to the control chip 120, the voltage (or the system operation VSYS) received by the control chip 120 may be slightly lower than the voltage (or the output voltage VOUT) provided by the control chip 110 due to the influence of the length and the material of the connection line 130. For example, the output voltage VOUT provided by the control chip 110 may be 5V, and the system voltage VSYS received by the control chip 120 may be 4.96V.

To compensate the IR drop (voltage drop) caused by the connection line 130, when the control chip 120 is coupled to the control chip 110 via the connection line 130, the control chip 110 enters a compensation mode. In the compensation mode, the control chip 110 sends an inquiry signal S_QY to the control chip 120 via the communication path 132 of the connection line 130 to inquire about for the actual level of the system voltage VSYS received by the control chip 120. The control chip 120 detects the system voltage VSYS according to the inquiry signal S_QY to generate a detection result. The control chip 120 generates an acknowledgement signal S_AK according to the detection result and outputs the acknowledgement signal S_AK. The control chip 110 obtains a difference between the system voltage VSYS and the output voltage VOUT according to the acknowledgement signal S_AK. The control chip 110 adjusts the output voltage VOUT according to the difference between the system voltage VSYS and the output voltage VOUT, such as to increase the output voltage VOUT from 5V to 5.04V.

In one embodiment, after the control chip 120 is coupled to the control chip 110 via the connection line 130, the control chip 110 first sets the output voltage VOUT. In this case, the output voltage VOUT is equal to an initial value (e.g., 5V). Then, the control chip 110 provides the output voltage VOUT to the control chip 120 via the power path 131. Next, the control chip 110 sends an inquiry signal S_QY to the control chip 120 to inquire about the level of the system voltage VSYS. In some embodiments, after the control chip 110 sends the inquiry signal S_QY, if the control chip 110 does not receive an acknowledgement signal S_AK after a period of time, it means that the control chip 120 does not support the inquiry signal S_QY. Therefore, the control chip 110 may pause the compensation operation.

In one embodiment, the inquiry signal S_QY and the acknowledgement signal S_AK match a specific communication protocol. The specific communication protocol may be a power delivery (PD) protocol or a universal fast charging specification (UFCS) protocol. In this case, the control chip 110 encodes inquiry information according to the specific communication protocol to generate the inquiry signal S_QY. The control chip 120 utilizes the same specific communication protocol to decode the inquiry signal S_QY to generate a decoded result. The control chip 120 encodes reply information according to the decoded result to generate the acknowledgement signal S_AK. The control chip 110 utilizes the same specific communication protocol to decode the acknowledgement signal S_AK to generate an encoded result. The control chip 110 operates according to the encoded result. For example, the control chip 110 may adjust the output voltage VOUT.

In other embodiments, the control chip 120 may utilize the communication path 132 to direct the control chip 110 to increase the output voltage VOUT. In an ideal condition, the control chip 120 requests the control chip 110 to increase or reduce the output voltage VOUT according to its own needs. However, when the operation of the control chip 120 is abnormal, the control chip 120 may request a large output voltage VOUT. When the control chip 110 provides the large output voltage VOUT according to the request of the control chip 120, the control chip 120 may be damaged by the large output voltage VOUT. In other embodiments, although the control chip 120 does not request the control chip 110 to increase the output voltage VOUT, the control chip 110 may mistakenly increase the output voltage VOUT so that the output voltage VOUT exceeds the upper limit for the voltage that the control chip 120 can withstand. Therefore, before entering a normal mode, the control chip 110 may enter a setting mode. In the setting mode, the control chip 110 sends an inquiry signal S_QY to inquire about the upper limit for the voltage that the control chip 120 can withstand. Then, the control chip 110 uses the upper limit for the voltage that the control chip 120 can withstand as a first protect-point voltage according to the reply of the control chip 120. After entering the normal mode, the control chip 110 provides the appropriate output voltage VOUT according to the first protect-point voltage. For example, when the control chip 120 requests a voltage which is higher than the first protect-point voltage, the control chip 110 may ignore the request from the control chip 120.

In other embodiments, in the setting mode, the control chip 110 utilizes the inquiry signal S_QY to query the control chip 120 for a voltage lower limit at which the control chip 120 can maintain normal operation. The control chip 110 uses the voltage lower limit as a second protect-point voltage. In this case, in the normal mode, when the control chip 120 requests a voltage which is less than the second protect-point voltage, the control chip 110 may ignore the request of the control chip 120.

In some embodiments, after the connection line 130 is reconnected between the control chips 110 and 120, the control chip 110 utilizes the inquiry signal S_QY to obtain a new protect-point voltage. The control chip 110 replaces the previous protect-point voltage with the new protect-point voltage. Therefore, the control chip 110 is capable of providing an overvoltage protection or an undervoltage protection for different control chips 120. In one embodiment, the control chip 110 stores the protect-point voltage in a volatile memory. In this case, when the control chip 110 is re-powered, the control chip 110 re-enter the setting mode to detect and record the upper limit for the voltage that the control chip 120 can withstand. Before the control chip 110 inquires about the voltage upper limit of the control chip 120, the control chip 110 may set the output voltage VOUT to an initial value and then query the control chip 120.

In one embodiment, after the control chip 110 is coupled to the control chip 120, the control chip 110 may set the output voltage VOUT to an initial value and then provide the output voltage VOUT to the control chip 120. Next, the control chip 110 enters a compensation mode or a setting mode. In the compensation mode, the control chip 110 performs a compensation operation to compensate the impact of the connection line 130 on the output voltage VOUT. After finishing the compensation operation, the control chip 110 may enter a setting mode. In another embodiment, after finishing the compensation operation, the control chip 110 may directly enter a normal mode. In the normal mode, the control chip 110 adjusts the output voltage VOUT according to the request of the control chip 120. Additionally, when the control chip 110 enters the setting mode, the control chip 110 performs a setting operation to set the protect-point voltage of the control chip 120. After finishing the setting operation, the control chip 110 may directly enter the normal mode or the compensation mode. For example, the control chip 110 may set the protect-point voltage and does not compensate the impact of the connection line 130 on the output voltage VOUT.

Figure 2B:
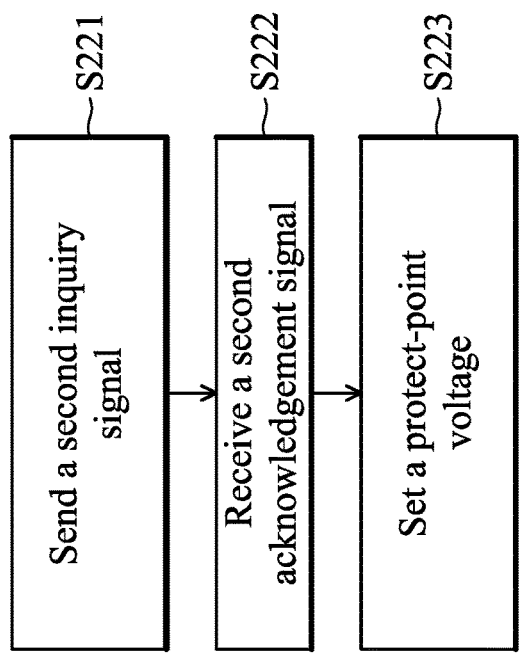
FIG. 2B is a flowchart of a control method of the control chip shown in FIG. 1 which performing a setting operation in accordance with an embodiment of the present disclosure.
Figure 2A:
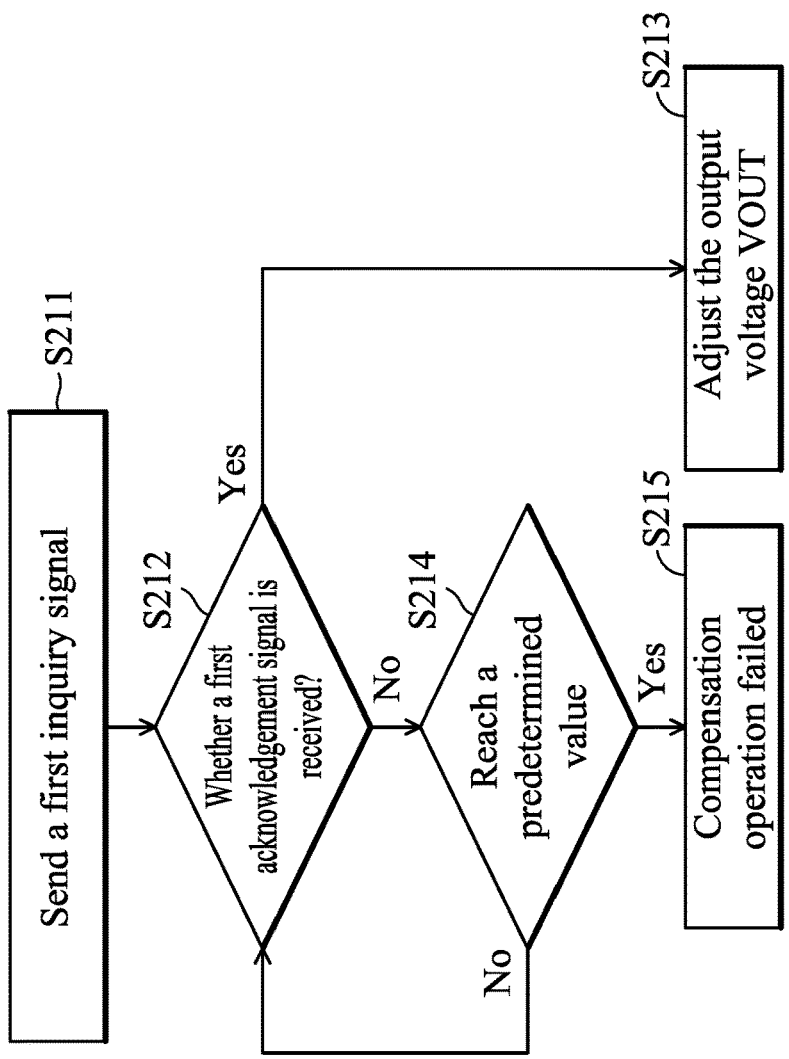
FIG. 2A a flowchart of a control method of the control chip shown in FIG. 1 which performing a compensation operation in accordance with an embodiment of the present disclosure.

FIG. 2A a flowchart of a control method of the control chip 110 performing a compensation operation in accordance with an embodiment of the present disclosure. The control method may take the form of a program code. When the program code is loaded into and executed by a machine, the machine thereby becomes the control chip 110 for practicing the control method. First, the control chip 110 sends a first inquiry signal to query the control chip 120 for the level of the system voltage VSYS (step S211). In one embodiment, the first inquiry signal matches a USB PD protocol or an UFCS protocol.

Next, a determination is made as to whether a first acknowledgement signal is received (Step S212). When the control chip 110 receives the first acknowledgement signal, the control chip 110 adjusts the output voltage VOUT according to the first acknowledgement signal (step S213). In one embodiment, the control chip 110 decodes the first acknowledgement signal to generate a decoded result and then obtains the actual level of the system voltage VSYS received by the control chip 120 according to the decoded result. In this case, the control chip 110 adjusts the output voltage VOUT (e.g., from 5V to 5.04V) according to a difference (e.g., 0.4V) between the output voltage VOUT and the system voltage VSYS. In some embodiments, the communication protocol of the first acknowledgement signal is the same as the communication protocol of the first inquiry signal.

When the control chip 110 does not receive the first acknowledgement signal, the control chip 110 determines whether the duration of the control chip 110 waiting the first acknowledgement signal reaches a predetermined value (step S214). When the duration of the control chip 110 waiting the first acknowledgement signal reaches the predetermined value, it means that the compensation operation has failed. When the duration of the control chip 110 waiting the first acknowledgement signal does not reach the predetermined value, step S212 is executed to wait the first acknowledgement signal.

In other embodiments, before the control chip 110 sends the first inquiry signal, the control chip 110 sets the output voltage VOUT so that the output voltage VOUT is equal to an initial value. Then, the control chip 110 provides the output voltage VOUT to the control chip 120. In this case, the control chip 110 may send a third inquiry signal to query the control chip 120 for the actual voltage received by the control chip 120. The control chip 120 generates a third acknowledgement signal according to the actual voltage. The control chip 110 decodes the third acknowledgement signal to determine whether the actual voltage received by the control chip 120 is equal to the initial value. When the actual voltage received by the control chip 120 does not equal to the initial value, the control chip 110 adjusts the output voltage until the actual voltage received by the control chip 120 is equal to the initial value FIG. 2B is a flowchart of a control method of the control chip 110 which performing a setting operation in accordance with an embodiment of the present disclosure. The control method may take the form of a program code. When the program code is loaded into and executed by a machine, the machine thereby becomes the control chip 110 for practicing the control method. First, the control chip 110 sends a second inquiry signal to query the control chip 120 about an upper limit for the voltage that the control chip 120 can withstand (step S221). In one embodiment, the second inquiry signal matches the USB PD protocol or the UFCS protocol.

Next, a second acknowledgement signal is received (step S222). In one embodiment, the control chip 110 decodes the second acknowledgement signal to generate a decoded result. Then, the control chip 110 obtains a voltage upper limit of the control chip 120 according to the decoded result. The voltage upper limit indicates the voltage that the control chip 120 can withstand. The control chip 110 uses the voltage upper limit of the control chip 120 as a protect-point voltage (step S223). In one embodiment, the control chip 110 stores the protect-point voltage in a volatile memory.

In some embodiments, after setting the protect-point voltage, the control chip 110 adjusts the output voltage according to the request provided by the control chip 120. In this case, the control chip 110 determines whether the voltage requested by the control chip 120 is higher than the protect-point voltage. When the voltage requested by the control chip 120 is higher than the protect-point voltage, the control chip 110 ignores the request sent from the control chip 120. At this time, the control chip 110 may maintain the output voltage VOUT. When the voltage requested by the control chip 120 is not higher than the protect-point voltage, the control chip 110 adjusts the output voltage VOUT according to the request sent from the control chip 120.

In other embodiments, before the control chip 110 sends the second acknowledgement signal, the control chip 110 sets the output voltage VOUT so that the output voltage VOUT is equal to an initial value. Then, the control chip 110 provides the output voltage VOUT to the control chip 120. In this case, the control chip 110 may send a third inquiry signal to inquire about the actual voltage the control chip 120 received. The control chip 120 generates a third acknowledgement signal according to the actual voltage received by the control chip 120. The control chip 110 decodes the third acknowledgement signal to determine whether the actual voltage received by the control chip 120 is equal to the initial value. When the actual voltage received by the control chip 120 is not equal to the initial value, the control chip 110 adjusts the output voltage until the actual voltage received by the control chip 120 is equal to the initial value.

Figure 2C:
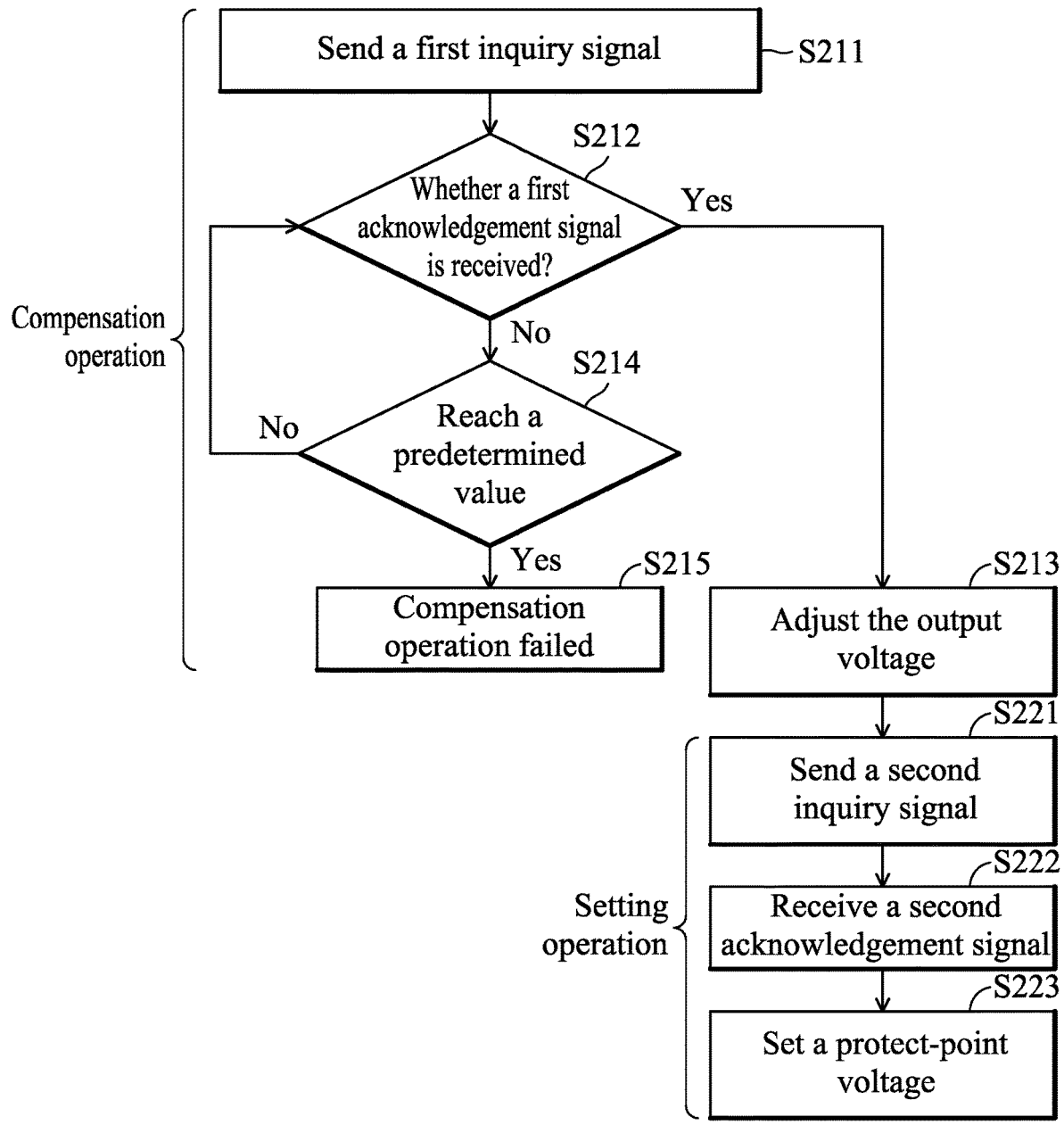
FIG. 2C is a flowchart of a control method of the control chip shown in FIG. 1 which performing a compensation operation and a setting operation performed in accordance with an embodiment of the present disclosure.

FIG. 2C is a flowchart of a control method of the control chip 110 which performing a compensation operation and a setting operation performed in accordance with an embodiment of the present disclosure. In one embodiment, the control chip 110 performs the compensation operation and then performs the setting operation. In this case, the compensation operation comprises steps S211~215 of FIG. 2A, and the setting operation comprises steps S221~S223. In another embodiment, the control chip 110 first performs the setting operation and then performs the compensation operation. In this case, steps S221~S223 are executed earlier than step S221.

Figure 3:
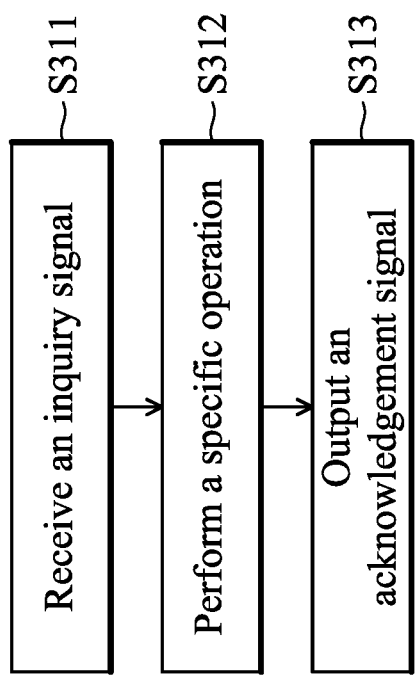
FIG. 3 is a flowchart of another exemplary embodiment of the control method of the control chip shown in FIG. 1 in accordance with an embodiment of the present disclosure.

FIG. 3 is a flowchart of a control method performed by the control chip 120 in accordance with an embodiment of the present disclosure. The control method may take the form of a program code. When the program code is loaded into and executed by a machine, the machine thereby becomes the control chip 120 for practicing the control method. First, the control chip 120 receives an inquiry signal (step S311). In one embodiment, before receiving the inquiry signal, the control chip 120 first receives an output voltage and uses the output voltage as a system voltage.

Next, a specific operation is performed according to the inquiry signal (step S312). In one embodiment, the control chip 120 decodes the inquiry signal to obtain the inquiry content of the inquiry signal. In this case, the control chip 120 performs different specific operations according to different inquiry signals. For example, when the inquiry content of the inquiry signal relates to the system voltage of the control chip 120, the control chip 120 performs a detection operation. The control chip 120 detects the system voltage to generate a detection result. In this case, the control chip 120 encodes the detection result to generate an acknowledgement signal. In another embodiment, when the inquiry content of the inquiry signal relates to the voltage upper limit of the control chip 120, the control chip 120 performs a notification operation. In this case, the control chip 120 encodes the voltage upper limit to generate an acknowledgement signal. In this case, the voltage upper limit is stored in the control chip 120 in advance. The control chip 120 comprises a storage circuit (not shown) to store the voltage upper limit. The control chip 120 reads the storage circuit to obtain the voltage upper limit and generates the acknowledgement signal according to the voltage upper limit.

Next, the acknowledgement signal is output (step S313). In one embodiment, the control chip 120 receives the inquiry signal and outputs the acknowledgement signal according to a specific communication protocol.

Figure 4:
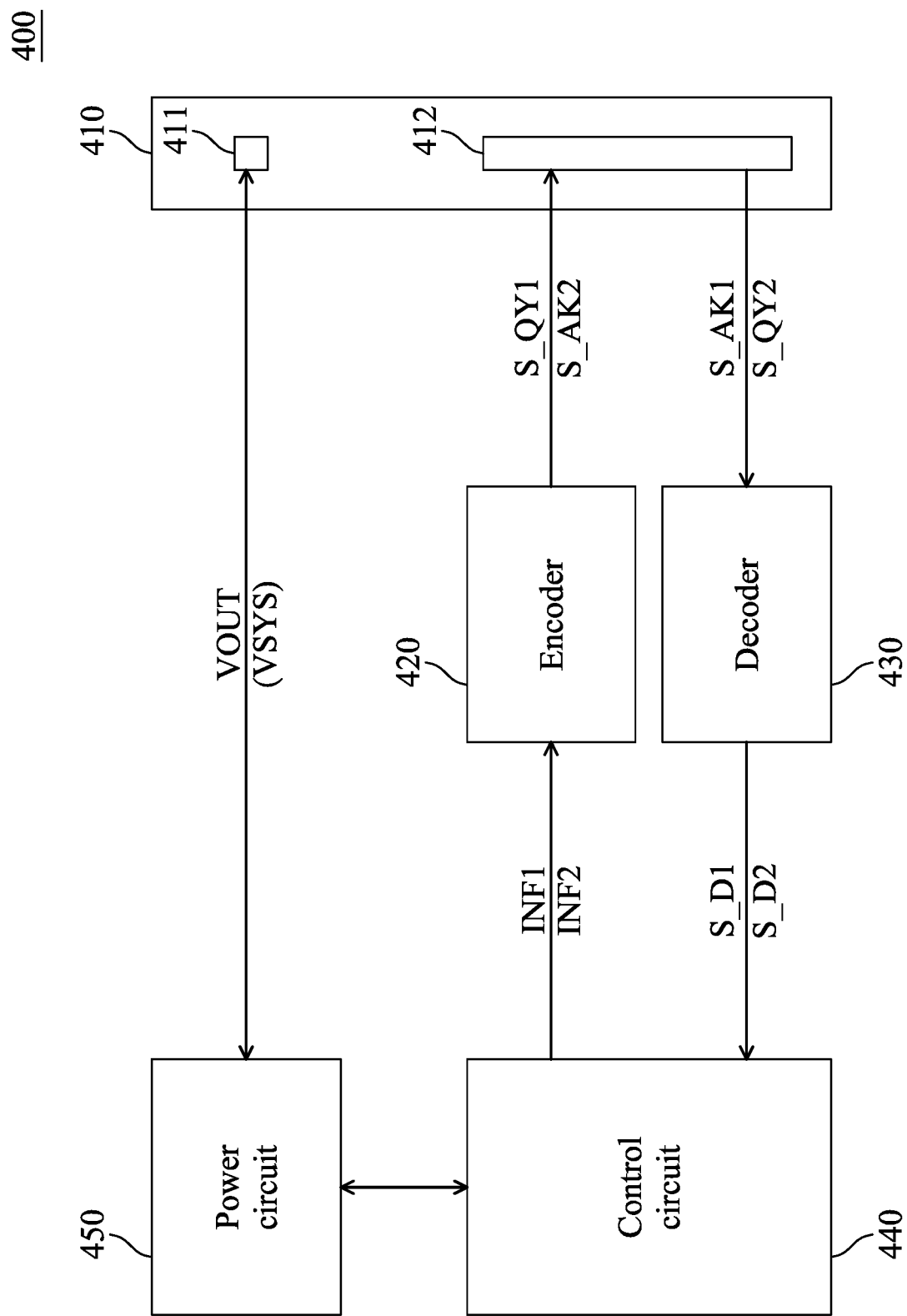
FIG. 4 is a schematic diagram of an exemplary embodiment of the control chip according to various aspects of the present disclosure.

FIG. 4 is a schematic diagram of an exemplary embodiment of the control chip according to various aspects of the present disclosure. The control chip 400 comprises a connection port 410, an encoder 420, a decoder 430, and a control circuit 440. The connection port 410 comprises a power interface 411. The power interface 411 is configured to transmit the output voltage VOUT or the system voltage VSYS. For example, when the control chip 400 serves as the control chip 110 of FIG. 1, the power interface 411 is configured to output the output voltage VOUT. When the control chip 400 serves as the control chip 120 of FIG. 1, the power interface 411 is configured to receive the output voltage VOUT. In this case, the output voltage entering the control chip 400 is referred to as the system voltage VSYS.

In other embodiments, the connection port 410 further comprises a communication interface 412. The communication interface 412 is configured to transmit the inquiry signals S_QY1 and S_QY2, and the acknowledgement signals S_AK1 and S_AK2. For example, when the control chip 400 serves as the control chip 110 of FIG. 1, the communication interface 412 outputs the inquiry signal S_QY1 to a first external chip and receives the acknowledgement signal S_AK1 from the first external chip. In this case, the inquiry signal S_QY1 and the acknowledgement signal S_AK1 match a first communication protocol. In another embodiment, when the control chip 400 serves as the control chip 120 of FIG. 1, the communication interface 412 receives the inquiry signal S_QY2 from a second external chip and outputs the acknowledgement signal S_AK2 to the second external chip. In this case, the inquiry signal S_QY2 and the acknowledgement signal S_AK2 match a second communication protocol. The second communication protocol may the same as or different from the first communication protocol.

The type of connection port 410 is not limited in the present disclosure. Any connection port can serve as the connection port 410, as long as the connection port is capable of transmitting power and communication signals. In one embodiment, the connection port 410 is a USB connection port. In this case, the power pin VBUS of the USB connection port serves as the power interface 411. The number of power pins of the power interface 411 is not limited in the present disclosure. The power interface 411 may comprise a single power pin to transmit a single voltage. In another embodiment, the power interface 411 comprises a plurality of power pins to transmit a plurality of voltages. In other embodiments, the pins D+ and D−, or CC1, or CC2 of the USB connection port serves as the communication interface 412. The number of pins of the communication interface 412 is not limited in the present disclosure. The communication interface 412 comprises a single communication pin to transmit the inquiry signal S_QY1 and the acknowledgement signal S_AK1, or transmit the inquiry signal S_QY2 and the acknowledgement signal S_AK2. In another embodiment, the communication interface 412 comprises at least two communication pins. In this case, a communication pin of the communication interface 412 transmits the inquiry signal S_QY1 (or the acknowledgement signal S_AK2), and the other communication pin of the communication interface 412 transmits the acknowledgement signal S_AK1 (or the inquiry signal S_QY2).

The encoder 420 encodes output information to generate the inquiry signal S_QY1 or the acknowledgement signal S_AK2. For example, when the control chip 400 serves as the control chip 110 of FIG. 1, the encoder 420 encodes the output information INF1 (or referred to as inquiry information) to generate the inquiry signal S_QY1. In this case, the inquiry signal S_QY1 is used to query a first external chip (not shown) about the system voltage, the voltage upper limit, or both. When the control chip 400 serves as the control chip 120 of FIG. 1, the encoder 420 encodes the output information INF2 to generate the acknowledgement signal S_AK2. In this case, the output information INF2 may indicate the level of the system voltage VSYS or the voltage upper limit of the control chip 400. In this case, a second external chip utilizes the acknowledgement signal S_AK2 to obtain the level of the system voltage VSYS or the voltage upper limit of the control chip 400. The structure of the encoder 420 is not limited in the present disclosure. Any circuit can serve as the encoder 420, as long as the circuit has an encoding function.

The decoder 430 decodes the acknowledgement signal S_AK1 or the inquiry signal S_QY2. For example, when the control chip 400 serves as the control chip 110 of FIG. 1, the decoder 430 decodes the acknowledgement signal S_AK1 from a first external chip to generate a decoded result S_D1. In this case, the decoded result S_D1 represents the system voltage or the voltage upper limit of the first external chip. When the control chip 400 serves as the control chip 120 of FIG. 1, the decoder 430 decodes the inquiry signal S_QY2 from a second external chip to generate a decoded result S_D2. The structure of the decoder 430 is not limited in the present disclosure. Any circuit can serve as the decoder 430, as long as the circuit has a decoding function.

The control circuit 440 provides the output information INF1 or INF2 and receives the decoded result S_D1 or S_D2. In one embodiment, when the control chip 400 serves as the control chip 110 of FIG. 1 and the control circuit 440 operates in a compensation mode, the control circuit 440 generates the output information INF1 to inquire a first external chip for the system voltage. In this case, the control circuit 440 obtains the system voltage of the first external chip according to the decoded result S_D1. In another embodiment, when the control chip 400 serves as the control chip 110 of FIG. 1 and the control circuit 440 operates in a setting mode, the control circuit 440 generates the output information INF1 to query the first external chip about the voltage upper limit. In this case, the control circuit 440 obtains the voltage upper limit of the control chip 400 according to the decoded result S_D1. The control circuit 440 uses the voltage upper limit of the first external chip as a protect-point voltage and stores the protect-point voltage in a storage circuit (not shown). The storage circuit may be disposed in the control circuit 440 or independent of the control circuit 440. The structure of the control circuit 440 is not limited in the present disclosure. In one embodiment, the control circuit 440 is a micro-controller unit (MCU).

In some embodiments, when the control chip 400 serves as the control chip 110 of FIG. 1, the control chip 400 performs a detection operation or a notification operation according to the decoded result S_D1. In one embodiment, the control chip 400 detects the level of the system voltage VSYS according to the decoded result S_D1 and generates the output information INF2 according to the detection result. In another embodiment, the control chip 400 reads the value (i.e., the voltage upper limit) of a register according to the decoded result S_D1. In this case, the control chip 400 generates the output information INF2 according to the value of the register.

In other embodiments, when the control chip 400 serves as the control chip 110 of FIG. 1, the decoder 430 decodes a request (not shown) from a first external chip to generate a decoded result. The control chip 440 obtains a request voltage according to the decoded result. In this case, the control circuit 440 determines whether the request voltage requested by the first external chip is higher than a protect-point voltage. When the request voltage requested by the first external chip is not higher than a protect-point voltage, the control circuit 440 adjusts the output voltage so that the output voltage VOUT is equal to the request voltage. However, when the request voltage requested by the first external chip is higher than a protect-point voltage, the control circuit 440 ignores the request of the first external chip. In one embodiment, the control circuit 440 does not adjust the output voltage VOUT.

In other embodiments, the control chip 400 further comprises a power circuit 450. The power circuit 450 may provide the output voltage VOUT or receive the system voltage VSYS. For example, when the control chip 400 serves as the control chip 110 of FIG. 1, the power circuit 450 generates the output voltage VOUT. In this case, the control circuit 440 controls the power circuit 450 to adjust the output voltage VOUT. In another embodiment, when the control chip 400 serves as the control chip 120 of FIG. 1, the power circuit 450 receives the system voltage VSYS. In this case, the power circuit 450 may transform the system voltage VSYS and provide the transformed voltage to other circuits of the control chip 400. In one embodiment, the control circuit 440 directs the power circuit 450 to detect the level of the system voltage VSYS. In this case, the power circuit 450 comprises a voltage-division circuit (not shown). The voltage division circuit processes the system voltage VSYS to generate a divided voltage which may be referred to as a detection result. The control circuit 440 generates the output information INF2 according to the divided voltage. The structure of the power circuit 450 is not limited in the present disclosure. Any circuit can serve as the power circuit 450, as long as the circuit is capable of providing power. In other embodiments, the power circuit 450 comprises a voltage detector (not shown) to detect the output voltage VOUT or the system voltage VSYS.

As described previously, since the control chip 100 or 400 compensates the IR drop caused by the connection line 130, the system voltage VSYS of the external chip is ensured to be equal to the output voltage VOUT. Additionally, the control chip 100 or 400 sets a protect-point voltage in advance. When an external chip (e.g., the control chip 120) sends a request to require that the control chip 100 or 400 increase the output voltage VOUT, the control chip 100 or 400 does not provide an excessive output voltage according to the protect-point voltage to avoid damaging the external chip. Furthermore, when the operation of the power circuit 450 is abnormal and the output voltage VOUT is increased by mistake, the control chip 100 or 400 prevents the excessive voltage from being output.

Control methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a control chip for practicing the control methods. The control methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a control chip for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control chip providing power to a sink device and comprising:
   a connection port comprising:
   a power pin configured to provide an output voltage to the sink device;
   a communication pin coupled to the sink device, providing an inquiry signal to the sink device according to a communication protocol, and receiving an acknowledgement signal provided by the sink device;
   an encoder encoding inquiry information to generate the inquiry signal;
   a decoder decoding the acknowledgement signal to generate a first decoded result; and
   a control circuit providing the inquiry information and operating in a compensation mode or a setting mode, wherein:
   in the compensation mode, the control circuit obtains an actual voltage received by the sink device according to the first decoded result and adjusts the output voltage according to the actual voltage received by the sink device,
   in the setting mode, the control circuit obtains a protect-point voltage of the sink device according to the first decoded result and adjusts the output voltage according to the protect-point voltage of the sink device to prevent the output voltage from being higher than the protect-point voltage,
   in a normal mode:
   the communication pin receives a request from the sink device;
   the decoder decodes the request to generate a second decoded result; and the control circuit determines whether to adjust the output voltage according to the second decoded result, in response to the request from the sink device requesting a request voltage, the control circuit determines whether the request voltage is higher than the protect-point voltage, in response to the request voltage being higher than the protect-point voltage, the control circuit does not adjust the output voltage.

2. The control chip as claimed in claim 1, wherein the connection port is coupled to the sink device via a connection line, and in response to the connection line being coupled to the connection port and the sink device, the control circuit sets the output voltage so that the output voltage is equal to an initial value.

3. The control chip as claimed in claim 2, wherein:
in the compensation mode:
the control circuit determines whether the output voltage received by the sink device is equal to the initial value;
in response to the output voltage received by the sink device not being equal to the initial value, the control circuit adjusts the output voltage so that the output voltage received by the sink device is equal to the initial value.

4. The control chip as claimed in claim 1, wherein the communication protocol is a power delivery (PD) protocol or a universal fast charging specification (UFCS) protocol.

5. The control chip as claimed in claim 1, wherein the connection port is a universal serial bus (USB), and at least one configuration channel pin of the USB serves as the communication pin.

6. The control chip as claimed in claim 1, wherein in response to the request voltage not being higher than the protect-point voltage, the control circuit sets the output voltage so that the output voltage is equal to the request voltage.

7. The control chip as claimed in claim 1, wherein:
the control circuit first operates in the compensation mode,
after adjusting the output voltage, the control circuit enters the setting mode,
in the setting mode, the control circuit stores the protect-point voltage, and
after storing the protect-point voltage, the control circuit enters the normal mode.

8. The control chip as claimed in claim 1, further comprising:
a power circuit configured to provide the output voltage, wherein the control circuit utilizes the power circuit to adjust the output voltage.

9. A control chip comprising:
a connection port comprising:
a power pin configured to receive an output voltage provided by a power source;
a communication pin coupled to the power source, receiving an inquiry signal from the power source, and outputting an acknowledgement signal;
a decoder decoding the inquiry signal to generate a decoded result;
a control circuit performing a detection operation and a notification operation according to the decoded result, wherein in response to the control circuit performing the detection operation, the control circuit detects the output voltage to generate a detection result, and in response to the control circuit performing the notification operation, the control circuit provides a protect-point voltage; and an encoder encoding the detection result to generate the acknowledgement signal after the control circuit performing the detection operation, and encoding the protect-point voltage to generate the acknowledgement signal after the control circuit performing the notification operation.

10. The control chip as claimed in claim 9, wherein the communication protocol is a PD protocol or a UFCS protocol.

11. The control chip as claimed in claim 9, further comprising:
a voltage division circuit processing the output voltage to generate a divided voltage,
wherein the control circuit uses the divided voltage as the detection result and provides the detection result to the encoder.

12. The control chip as claimed in claim 9, further comprising:
a storage circuit storing the protect-point voltage,
wherein in response to the control circuit performing the notification operation, the control circuit accesses the storage circuit to obtain the protect-point voltage.

13. A control method comprising:
providing an output voltage to a sink device;
sending an inquiry signal to the sink device;
receiving an acknowledgement signal provided by the sink device;
performing a compensation operation or a setting operation according to the acknowledgement signal;
wherein:
the compensation operation is performed to adjust the output voltage so that the output voltage received by the sink device is equal to an initial value, and
the setting operation is performed to prevent the output voltage from being higher than a protect-point voltage,
the setting operation further comprises:
decoding the acknowledgement signal to obtain the protect-point voltage;
storing the protect-point voltage,
in a normal mode:
receiving a request from the sink device;
obtaining a request voltage according to the request;
determining whether the request voltage is less than the protect-point voltage;
setting the output voltage to the request voltage in response to the request voltage being less than the protect-point voltage; and
ignoring the request in response to the request voltage not being less than the protect-point voltage.

14. The control method as claimed in claim 13, wherein the compensation operation further comprises:
decoding the acknowledgement signal to determine whether the output voltage received by the sink device is equal to the initial value;
adjusting the output voltage in response to the output voltage received by the sink device not being equal to the initial value.

15. The control method as claimed in claim 13, wherein one of the compensation operation and the setting operation is performed earlier than the other of the compensation operation and the setting operation.

16. The control method as claimed in claim 15, further comprising:

after finishing the compensation operation and the setting operation, entering the normal mode.

\* \* \* \* \*